United States Patent

Nishizawa et al.

Patent Number: 5,660,251
Date of Patent: Aug. 26, 1997

[54] VIBRATION DAMPING DEVICE FOR DISC BRAKE

[75] Inventors: Yukio Nishizawa; Hironobu Saka, both of Itami, Japan

[73] Assignee: Sumitomo Electric Industries, Ltd., Osaka, Japan

[21] Appl. No.: 648,695

[22] Filed: May 16, 1996

[30] Foreign Application Priority Data

May 26, 1995 [JP] Japan .................. 7-128195

[51] Int. Cl.⁶ .................. F16D 65/38
[52] U.S. Cl. .................. 188/73.35; 188/218 XL
[58] Field of Search .................. 188/73.35, 73.36, 188/73.37, 218 A, 218 XL; 74/574; 310/319

[56] References Cited

U.S. PATENT DOCUMENTS

| 5,032,753 | 7/1991 | Yamaguchi et al. | 310/319 X |
| 5,394,290 | 2/1995 | Ushiyama et al. | 361/146 |

FOREIGN PATENT DOCUMENTS

| 2-113143 | 4/1990 | Japan . | |
| 4-54325 | 2/1992 | Japan | 188/73.35 |
| 4-54324 | 2/1992 | Japan | 188/73.35 |

*Primary Examiner*—Peter M. Poon
*Attorney, Agent, or Firm*—Wenderoth, Lind & Ponack

[57] ABSTRACT

A vibration damping mechanism for use in a disc brake which can effectively suppress squeaks of the disc brake during braking. Vibrations of the rotor are detected by a piezoelectric element pressed against the back of an inner pad. The detection signal is inputted in a control circuit. The control circuit applies a control signal to another piezoelectric element which produces oscillations having a frequency that can reduce the detection signal to zero. The oscillations produced by the piezoelectric element are transmitted to the rotor to cancel the vibrations of the rotor. With this arrangement, signal components other than the rotor vibrations are scarcely contained in the detection signal, so that it is possible to produce oscillations that can cancel vibrations of the rotor with high accuracy. As a result, the rotor vibrations and thus squeaks of the disc brake are effectively suppressed.

4 Claims, 2 Drawing Sheets

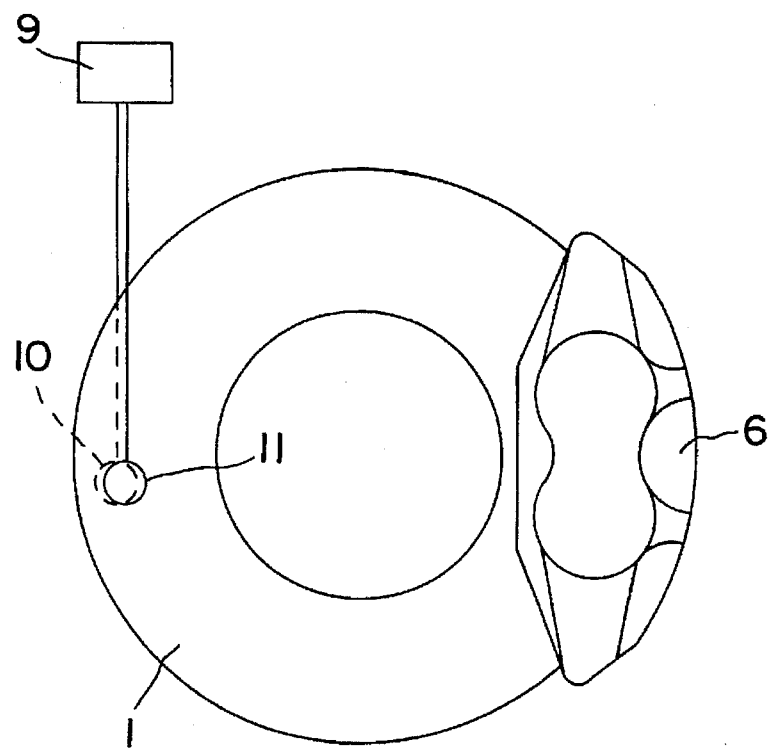
F I G. 3A
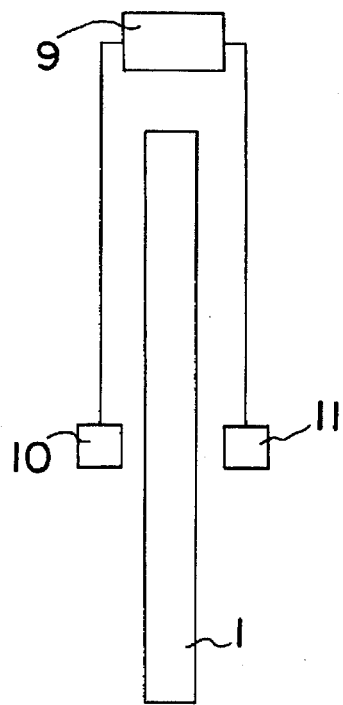
F I G. 3B

VIBRATION DAMPING DEVICE FOR DISC BRAKE

BACKGROUND OF THE INVENTION

The present invention relates to a vibration damping device for stopping squeaks of a disc brake by actively damping vibrations of a disc rotor (hereinafter referred to simply as "rotor"), which is a leading cause of squeaks of the disk brake.

Unexamined Japanese Patent Publications 4-54324 and 4-54325 disclose one type of active vibration damping mechanisms for suppressing squeaks of a disc brake. The mechanisms have a piezoelectric element for detecting vibrations of a brake pad (hereinafter simply referred to as "pad") and adapted to damp vibrations of the pad to suppress squeaks in response its detection signals.

A leading cause of squeaks of a disc brake is the vibration of the rotor. But as disclosed in the above publications, conventional vibration damping mechanisms are adapted to damp vibrations of a pad to indirectly suppress vibrations of the rotor. None of the prior are mechanisms can directly damp the vibration of the rotor. Thus, they cannot effectively reduce squeaks of disc brakes.

An object of the present invention is to solve the above no problem.

SUMMARY OF THE INVENTION

According to the present invention, there is provided a vibration damping device for use in a disc brake including a vibration detecting means for detecting vibrations of a disc rotor, an oscillating means for oscillating the disc rotor, and an oscillation control means for controlling the oscillating means based on an output from the vibration detecting means so as to cancel out vibrations of the disc rotor with the oscillation produced by the oscillating means.

Rotor vibrations, which cause squeaks of the disc brake, are canceled by directly oscillating the rotor with the oscillating means. Thus, squeaks can be suppressed more effectively than with a conventional vibration damping mechanism, which suppresses squeaks indirectly.

Other features and objects of the present invention will become apparent from the following description made with reference to the accompanying drawings, in which:

BRIEF DESCRIPTION OF THE DRAWINGS

FIG. 3A is a front view of another embodiment; and

FIG. 3B is a side view of the embodiment illustrated in FIG. 3A.

DETAILED DESCRIPTION OF THE PREFERRED EMBODIMENT

Figure 1:
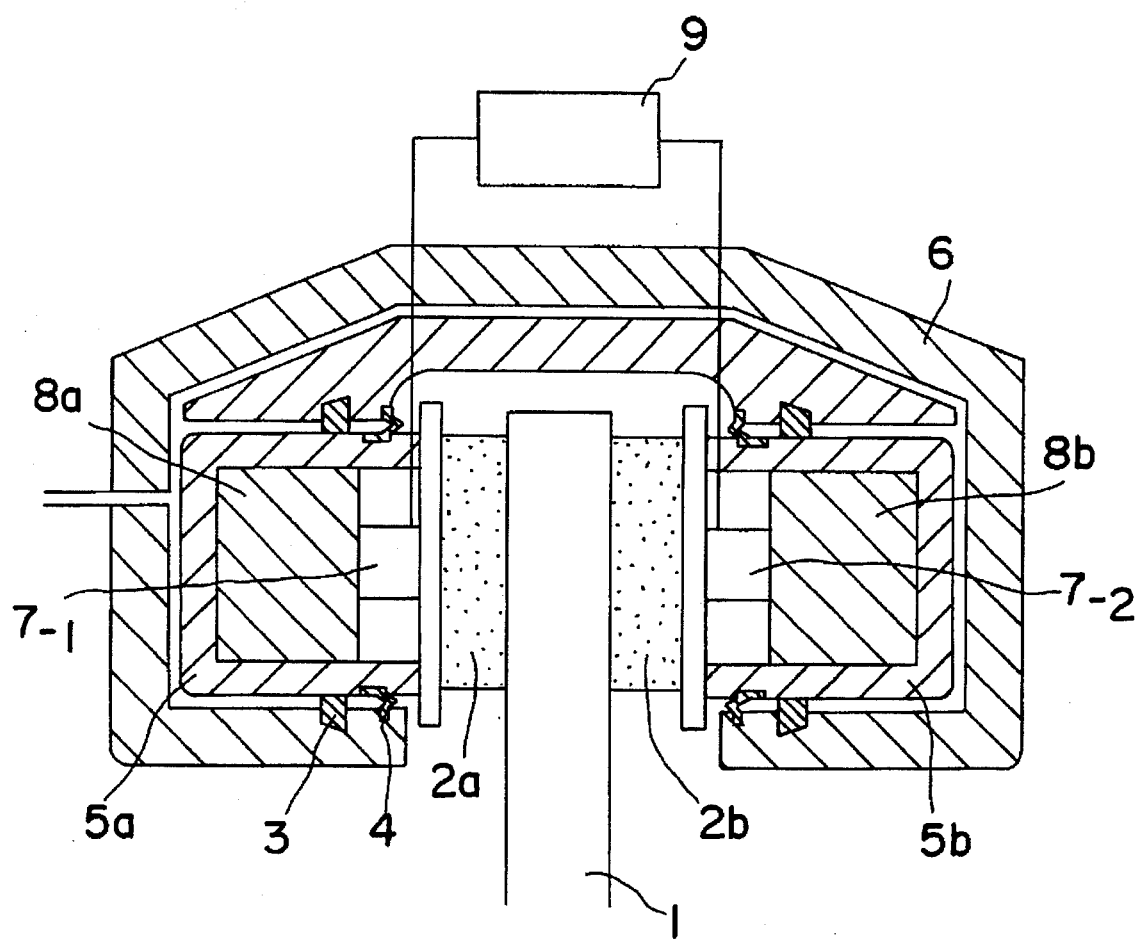
FIG. 1 is a sectional view of a first embodiment of the present invention mounted in a disc brake with opposed pistons.

FIG. 1 shows a first embodiment of the present invention. The vibration damping mechanism of this embodiment is used on an opposed-piston type disc brake having an inner pad 2a and an outer pad 2b which are brought into sliding contact with a rotor 1. The pads 2a, 2b are pushed by pistons 5a and 5b, respectively, and the pistons are mounted on a caliper 6. Piston seals 3 are provided and permit retraction or sliding movement of the pistons. Piston boots 4 seal the open ends of the cylinders.

In this embodiment, a piezoelectric element 7-1 is used as a vibration detecting means. It is pressed against the back of the inner pad 2a with a presser 8a mounted in the piston 5a. The piezoeletric elements 7-1 picks up vibrations of the rotor 1 which are transmitted through the inner pad 2a.

The detection signals from the piezoelectric element 7-1 are inputted in a control circuit 9, which produces control signals received based on the detection signals from the piezoelectric element 7-1 and applies the control signals to a piezoelectric element 7-2 which functions as an oscillating means. In response, the piezoelectric element 7-2 produces an oscillating force which is transmitted to the rotor 1 through the outer pad 2b to stop vibration of the rotor 1.

The control circuit 9 controls the gain and phase of the oscillating force produced by the piezoelectric element 7-2 so that the vibration of the rotor 1 will be canceled by the oscillating force. More specifically, it produces control signals that can reduce the output signals from the piezoelectric element 7-1 to zero and applies such control signals to the piezoelectric element 7-2.

Figure 2:
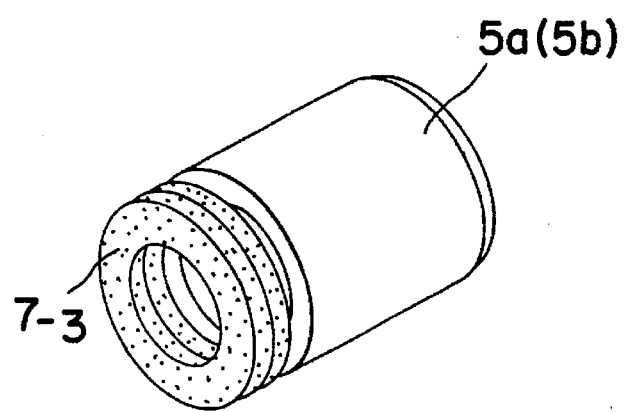
FIG. 2 is a perspective view showing an alternate arrangement of the piezoelectric elements.

In the embodiment of FIG. 1, similar to the piezoelectric element 7-1, the piezoelectric element 7-2 is pressed against the back of the outer pad 2b with a presser 8b. But as shown in FIG. 2 if a piezoelectric element, 7-3 bonded to a pressing surface of one or each of the pistons 5a and 5b, is used to detect vibrations or to apply an oscillating force, the pressers 8a and 8b are not necessary.

The vibration of the rotor may be detected, not only by a piezoelectric element, but by any other means such as an acceleration detector.

The oscillating means is also not limited to a piezoelectric element but may be any other means that produces an oscillating force using magnetic, static or other energies.

In the embodiment, the vibration detecting means is provided on the inner side of the rotor and the oscillating means on the outer side, but the locations may be reversed.

Also, the vibration damping mechanism of this embodiment can be used in a disc brake with a floating caliper. In this case, the vibration detecting means, or the oscillating means provided on the inner side of the rotor is pressed against the inner pad by the piston, while the other means, provided on the outer side where there is no piston, may be pressed against the outer pad, supported on e.g. outer claws of the caliper.

In an arrangement in which a pad is interposed between the rotor and each of the vibration detecting means and the oscillating means, the vibration detecting means should be provided on one side of the rotor, and the oscillating means should be provided on the other side thereof. We will explain why below.

The vibration detecting means and the oscillating means are intended to detect vibrations of and apply an oscillating force, not to the pads, but to the rotor, respectively. In the arrangement disclosed in Unexamined Japanese Patent Publication 4-54325, both the vibration detecting means and the oscillating means are provided on the same side of the rotor, so that the vibration of the rotor is detected and the oscillating force is applied to the rotor through the same pad. Thus, the vibration components detected by the vibration detecting means inevitably include not only the vibration of the rotor but the vibration of the pad caused by the oscillating force produced by the oscillating means. That is, the vibration detected does not precisely reflect the vibration of the rotor because it contains the vibration of the pad which is caused by the oscillating means. The vibration detecting means thus produces "inaccurate" detection signals. Since the oscillating means produces an oscillating force based on the "inaccurate" detection signals, it is impossible to effectively cancel the vibration of the rotor.

In contrast, in the arrangement of the present invention, the vibration of the rotor is detected through a first one of the two pads, while the oscillating force is applied to the rotor through the other (second) pad. Thus, the vibration detected by vibrations detecting means does not contain the vibration of the second pad caused by the oscillating means, so that the vibration detecting means can produce "accurate" detection signals. Strictly speaking, however, the first pad is also vibrating more or less while the rotor is vibrating, so that the vibration detected by the vibration detection means contains "both the rotor vibration and the vibration of the first pad". But practically, since the first pad is not oscillated by the oscillating means, its vibration may be regarded as approximately zero ($\approx 0$).

The term "vibration of the pad" herein used refers not to the vibration induced by the vibration of the rotor, but the vibration of the pad produced separately from the vibration of the rotor.

FIGS. 3A–3B show a second embodiment of the present invention. The vibration detecting means and the oscillating means of this embodiment are a photosensor 10 and an electromagnet 11, respectively. The photosensor 10 and the electromagnet 11 are provided out of contact with the rotor 1 at a position other than an area where the caliper 6 is mounted. The photosensor 10 emits light against the end surface of the rotor 1 and receives the reflected light at its light intercepting portion to detect changes in light intensity and thus the vibration of the rotor. Instead of a photosensor, any other non-contact distance detector such as a magnetic type, an eddy current type or a capacitance type detector may be used.

The electromagnet 11 can oscillate the rotor 1 in a non-contact manner by producing a magnetic force because the rotor is made of a magnetizable material. Since electromagnets can produce only an attraction force, it is necessary to provide an additional electromagnet on the other side of the electromagnet 11 or to magnetize the surface of the rotor facing the electromagnet 11 to produce both an attraction force and a repulsive force. With this arrangement, it is possible to produce oscillating forces that can cancel out the vibration of the rotor by controlling the current applied to the electromagnet and its direction with the control circuit 9. While not shown, the photosensor 10 and the electromagnet 11 may be mounted on non-rotating members present around the rotor such as mounting brackets.

Other non-contact oscillating means such as one that utilizes static energy may be used to oscillate the rotor.

The vibration damping mechanism according to the present invention may be constructed by combining the first embodiment with the second embodiment. For example, it may comprise a non-contact type vibration detecting means as shown in FIG. 3 and an oscillating means for oscillating the rotor through the pad as shown in FIG. 1.

Since the vibration damping mechanism of the present invention reduces the vibration of not the pads but directly the rotor, it is possible to suppress squeaks of the disc brake more effectively than with conventional vibration damping mechanisms.

What is claimed is:

1. A vibration damping device for a disc brake, said vibration damping device comprising:

a non-contact type vibration detecting means for directly detecting vibrations of a disc rotor without contacting the disc rotor and outputting a signal which is indicative of the detected vibrations;

a non-contact type oscillating means for generating oscillations to directly oscillate the disc rotor without contacting the disc rotor; and an oscillation control means for controlling said oscillating means based on an output signal received from said vibration detecting means so that oscillations generated by said oscillating means will cancel out vibrations of the disc rotor.

2. The vibration damping device as claimed in claim 1, wherein said vibration detecting means comprises a photodetector and said oscillating means comprises an electromagnet.

3. A vibration damping device for a disc brake, the vibration damping device comprising:

a vibration detecting means for detecting vibrations of a disc rotor and outputting a signal which is indicative of detected vibrations, wherein said vibration detecting means detects vibrations of the disc rotor through a first brake pad located on a first side of the disc rotor;

an oscillating means for oscillating the disc rotor, wherein said oscillating means generates an oscillating force and applies the generated oscillating force to the disc rotor through a second brake pad located on a second side of the disc rotor so that oscillations generated by said oscillating means are isolated from said vibration detection means; and an oscillation control means for controlling said oscillating means based on an output signal received from said vibration detecting means so as to cancel out vibrations of said disc rotor with oscillations forces generated by said oscillating means.

4. The vibration damping device as claimed in claim 3, wherein:

said vibration detecting means comprises a piezoelectric element which is adapted to engage the first brake pad of the disc brake; and said oscillating means comprises a piezoelectric element which is adapted to engage the second brake pad of the disc brake.

* * * * *